United States Patent [19]
Faraj

[11] Patent Number: 6,012,442
[45] Date of Patent: Jan. 11, 2000

[54] OUTDOOR GRILL

[76] Inventor: Abdul-Razzak Faraj, P.O. Box 566068, Atlanta, Ga. 31156

[21] Appl. No.: 09/182,612

[22] Filed: Oct. 29, 1998

[51] Int. Cl.[7] ............................. F24C 3/00; F21V 33/00
[52] U.S. Cl. .................................. 126/39 BA; 126/39 C; 126/19 R; 126/275 R; 362/92
[58] Field of Search ................ 126/41 R, 39 BA, 126/39 C, 19 R, 275 R, 273 R, 190, 200; 362/92; 99/341

[56] References Cited

U.S. PATENT DOCUMENTS

| | | | |
|---|---|---|---|
| 1,505,273 | 8/1924 | Maul ........................................ | 126/41 R |
| 2,129,339 | 9/1938 | Turner ..................................... | 362/92 |
| 2,323,821 | 7/1943 | Lindemann ............................. | 126/41 R |
| 5,257,169 | 10/1993 | Walendziak ............................ | 362/92 |

FOREIGN PATENT DOCUMENTS

| | | | |
|---|---|---|---|
| 1200156 | 12/1959 | France ................................. | 126/39 C |

*Primary Examiner*—Ira S. Lazarus
*Assistant Examiner*—Sara Clarke
*Attorney, Agent, or Firm*—John L. James

[57] ABSTRACT

A grill has horizontal shelves attached to its sidewalls for holding charcoal vertically along the sidewall in different compartments. Compartments are selected for cooking according to the amount of heat required and the size and configuration of the food. A mesh framework with screens attached hold the coals in position. Cooking progress is viewed through a window and a transparent dome cover. The positioning of the coals relative to the food allows cooking from all sides speed cooking. Cooking racks of various shapes accommodate all foods.

2 Claims, 5 Drawing Sheets

OUTDOOR GRILL

FIELD OF THE INVENTION

This invention relates generally to outdoor grills, and, more particularly to a grill having a cooking rack positioned relative to the fire box for fast cooking of the food.

BACKGROUND OF THE INVENTION

It is desirable to use a grill to cook food on certain occasions. One of the problems with a grill is that the cooking process is a slow process. To speed the cooking process, a higher cooking temperature can be used, but using a higher temperature increases the likelihood that the food will burn. It is therefore desirable to have a grill that can speed the cooking process without danger of burning the food.

Conventional outdoor grills have a cooking rack suspended over a firebox. When food is placed on the rack for cooking, one side of the food is cooked and the food turned to cook the other side. This process ensures thorough cooking but is not well suited for someone in a hurry. Some grills have adjustable racks wherein the distance between the fire and rack is variable to cook food at a faster or slower pace, but only one side of the food cooks at a time. Accordingly, it will be appreciated that it would be highly desirable to have a grill that cooks both sides of the food simultaneously and thereby reduce cooking time.

To reduce cooking time, some grills have a covering lid to trap heat similar to a household oven. Unfortunately, heat escapes slowing cooking time when the lid is opened or removed to observe cooking progress. It is desirable to have a grill in which cooking progress can be observed without removing the covering lid thereby retaining heat and reducing cooking time.

SUMMARY OF THE INVENTION

The present invention is directed to overcoming one or more of the problems set forth above. Briefly summarized, according to one aspect of the invention, a grill for outdoor use speeds cooking time by heating the food from above, below and the sides instead of from below alone. The heat source is positioned along the bottom of the grill and along the sidewalls so that the heat penetrates the food from all sides giving the minimum cooking time possible. The cooking racks are specially shaped to hold the food at a position so that it can be heated from two sides at once. The grill uses a glass cover so that the cooking progress may be viewed without disturbing the heat, therefore yielding a faster cooking time.

According to another aspect of the invention, a grill has a door like a conventional oven but speeds cooking by heating food from above and below. Heating elements along the rear of the oven also speed cooking. By having top and bottom heating elements, the grill can cook two different foods simultaneous at different temperatures so that a complete meal can be prepared at one time.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
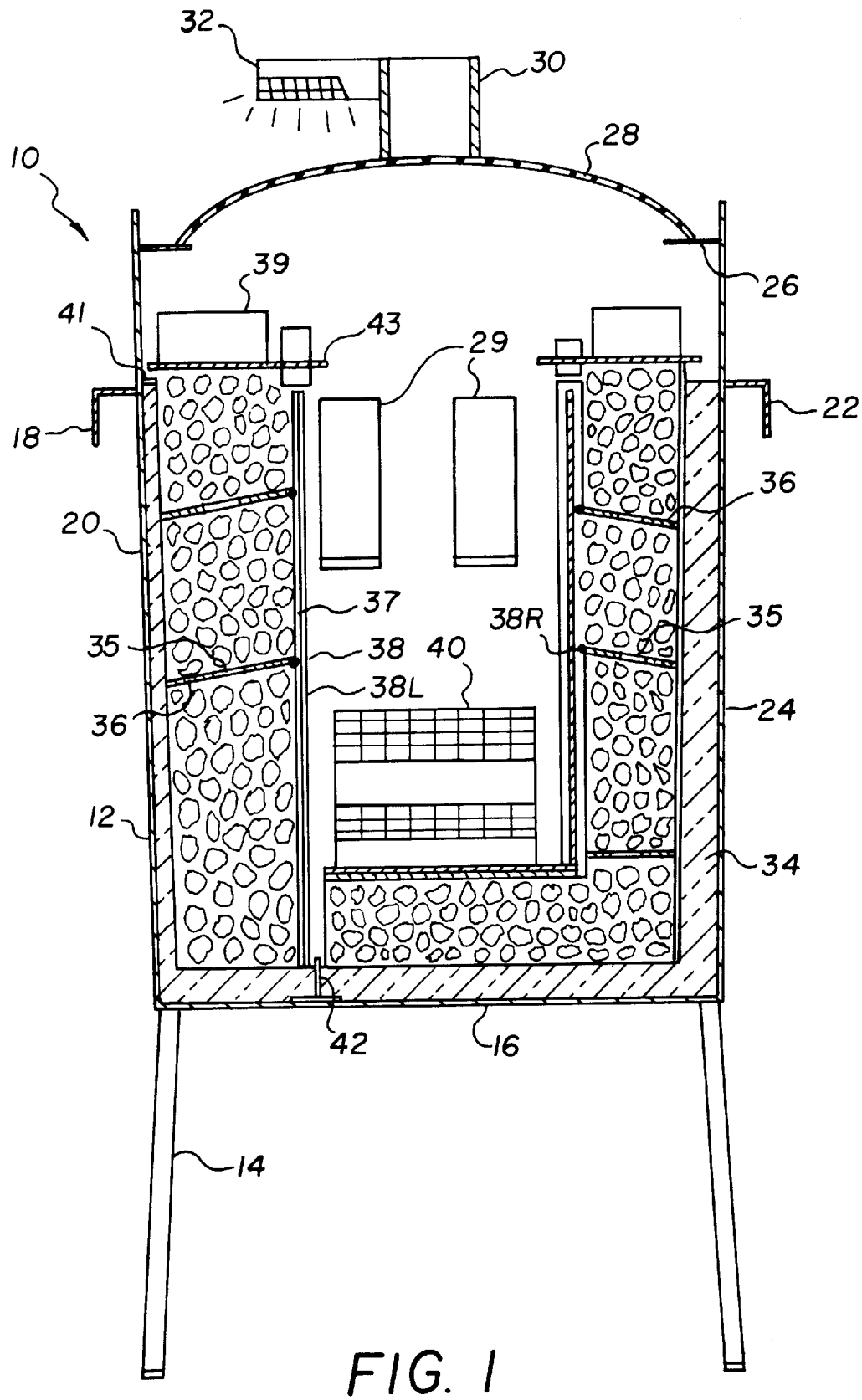
FIG. 1 is a diagrammatic sectional view of a preferred embodiment of an outdoor grill illustrating the relationship between the charcoal used for heating and the rack for supporting the food to be cooked according to the present invention.

Referring to FIG. 1, an outdoor grill 10 has a housing 12 supported on a plurality of legs 14. The legs 14 are preferably attached to the bottom 16 of the housing 12 but may be attached along the lower portion of the housing sidewalls. The legs 14 may be permanently attached to the bottom 16 or may be removably attached to save space when storing or transporting the grill. Legs 14 may be adjustable to vary the height of the grill for the convenience of the user. A left handle 18 is attached to a left sidewall 20 of the housing 12 while a right handle 22 is attached to the right sidewall 24 of the housing 12. The handles are preferably constructed of a heat insulated material or may be of metal with a wooden hand hold as is common in the art.

An annular rim 26 is formed on the inside of the sidewalls 20, 24 near the top of the grill for supporting a cover 28 that is preferably constructed of glass or other transparent material so that the interior of the housing can be viewed with the cover 28 in place. Windows 29 below the annular rim 26 in the sidewalls may also be used for viewing cooking progress. One of the windows 29 may be hinged to function as a door to aid loading fuel and food. A chimney 30 is attached to the cover 28 about an opening in the cover to vent exhaust gases from the housing during cooking. Chimney 30 also provides a convenient location for positioning a light assembly 32 which is used to illuminate the interior of the grill through the transparent cover 28. Cooking progress is viewed through the cover 28 or window 29 without removing cover 28.

Inside the housing, the sidewalls are preferably lined with an insulating material 34 which helps keep heat inside the housing and which helps keep the outside of the housing relatively cool. Heat is provided by charcoal which is contained in a structure in the housing that contains a plurality of shelves 36 that extend horizontally from the sidewalls to the interior portion of the housing to support the charcoal so that the charcoal can be stacked along the sidewalls and bottom of the housing to provide heat from all directions. The shelves 36 are oriented horizontally to divide the charcoal into vertical sections so that one or more sections can be used at any given time depending upon the amount of food to be cooked. The shelves have central openings 35 which allow charcoal introduced from the top to fall through a central opening 35 to lower shelves and lower levels of the grill. The open ends of the shelves that are nearest the center of the housing are covered by a screen 38, supported by a mesh grillwork 37, which prevents the coals, ash and debris from failing into the food cooking area as the coals burn and shift position. The charcoal may encircle the entire inside diameter of the housing or may cover selected portions of it sufficient to provide uniform heating.

Still referring to FIG. 1, the charcoal used for fuel is preferably held in position by a mesh framework 37 positioned inside the housing with the charcoal filling a space existing between the framework 37 and the housing sidewalls 20, 24. The mesh framework 37 is sturdy enough to support a metal cap 39 that sits atop the framework 37 as well as the screen 38. The metal cap 39 is removable to fill the grill with charcoal. Flanges 41 fastened to the interior of the sidewalls support the edge of the metal cap 39 that abut the sidewalls and stops or limits downward motion of cap 39. Flange 41 may be welded to the sidewall or attached with a screw or other fastening device. Metal cap 39 and flanges 41 may have alignable openings for receiving pins to hold the cap, and thereby the framework, in position. A pin may be integrally formed on one of the cap and flange to mate with an opening on the other of the cap and flange to hold the two together. The weight of the metal cap 39 is sufficient to keep it properly positioned atop the mesh framework 37 without any other fastening devices. A bib 43 of the metal cap 39 has an opening through which the top of the screens 38 protrude to keep the screens 38 properly positioned against the charcoal. One or more flanges 42 attached to the sidewalls or bottom of the housing help hold the charcoal containers in position. The flanges 42 on the bottom of the housing also keep the bottom of the screens properly positioned.

The shelves 36, screens 38 and mesh framework 37 define the fireboxes for heating. The shelves 36 extend horizontally to divide the charcoal vertically into sections each of which can be used for heating, individually or collectively. As illustrated in FIG. 1, the shelves line only a portion of the sidewalls with a left section 38L and its associated framework extending from the bottom 16 of the grill housing. Such a left section may extend a full 360° around the sidewalls or any portion of the sidewalls. It can extend along alternate portions of the sidewalls so that it extends a full 360° but in increments with spaces between increments. For example, uniform cooking can be achieved with charcoal in four increments extending 45° with 45° spacing between increments, or six increments of 30° with 30° spacing between increments. As illustrated in FIG. 1, the right section 38R places charcoal on the bottom of the housing to heat food from below. Food can thus receive heat from below, one side, all sides, or from both sides and the bottom.

A cooking basket or rack 40 is positioned in the housing and may be removably attached to the housing sidewalls or may be supported on legs that rest on the bottom of the housing. The basket 40 may consist of a single rack or may be a basket or may be a plurality of baskets or racks that stack one atop the other.

Figure 2:
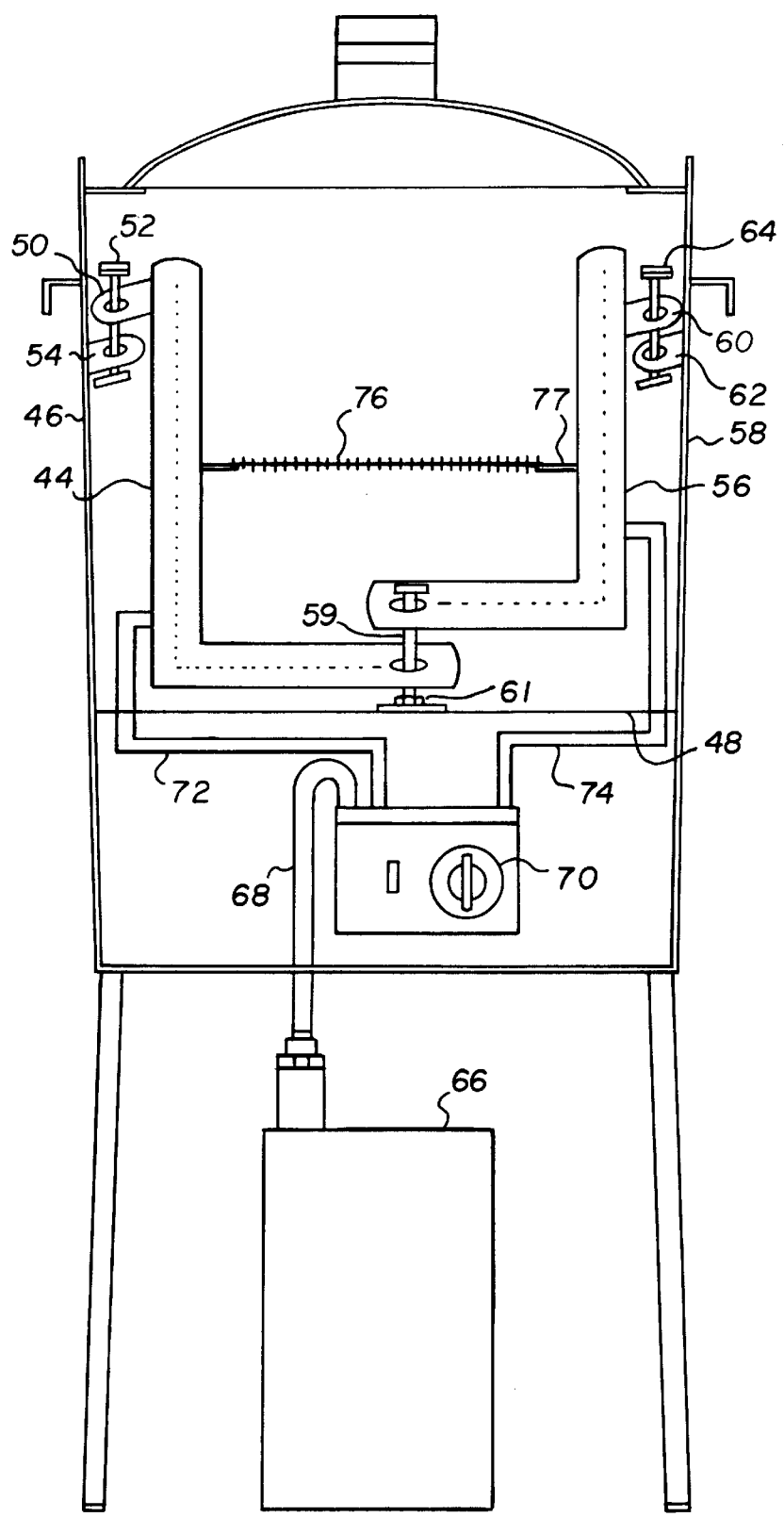
FIG. 2 is a diagrammatic sectional view similar to FIG. 1 but illustrating another embodiment of a grill using gas for heating.

Referring to FIG. 2, a gas grill has a left heating element 44 that extends along the left sidewall 46 and along the left portion of the bottom 48 of the grill to heat food from the bottom and left side. The heating element 44 has a flange 50 with an opening for receiving a bolt 52 therethrough. A flange 54 is attached to the left sidewall 46 and has an opening for receiving bolt 52 therethrough for fastening heating element 44 to the sidewall. While only one heating element is shown along the left side, there may be a plurality of heating elements to extend around the inside perimeter of the housing. Similarly a right heating element 56 extends along the right sidewall 58 and right portion of the bottom 48. It also has a flange 60 that cooperates with a flange 62 to receive a bolt 64 to fasten the right heating element 56 to the right sidewall 58. The heating elements also have flanges or openings on their bottom ends for receiving a bolt 59 to connect with a nut 61 fastened to a bottom flange fastened to the bottom of the grill. Alternately, the nut can be connected directly to the bottom of the grill. Where there are multiple heating elements, each may have its own bolt or several can be connected together along the bottom.

Gas for cooking is channeled through a conduit 68 from a gas supply container 66 to a regulator 70 and then to the left gas burning heating element 44 via a left conduit 72, and to the right gas burning heating element 56 through a right conduit 74. The conduits are shown attached to the vertical portion of the heating elements below the location of the rack which helps gas flow to all portions of the heating elements. The regulator 70 controls the flow of gas from the tank 66 to the burners 44 and 56 to control the cooking temperature and therefore the cooking time. The regulator 70 also controls the fuel/air mixture to accommodate different fuel gases. A cooking rack 76 may be movably attached to the interior housing sidewalls or may be suspended from the heating elements 44 and 56 on brackets or flanges 77 on the heating elements. As illustrated, cooking rack 76 is a flat rack with a wide surface area but may be a cage or basket for holding items of food to be cooked.

Figure 3:
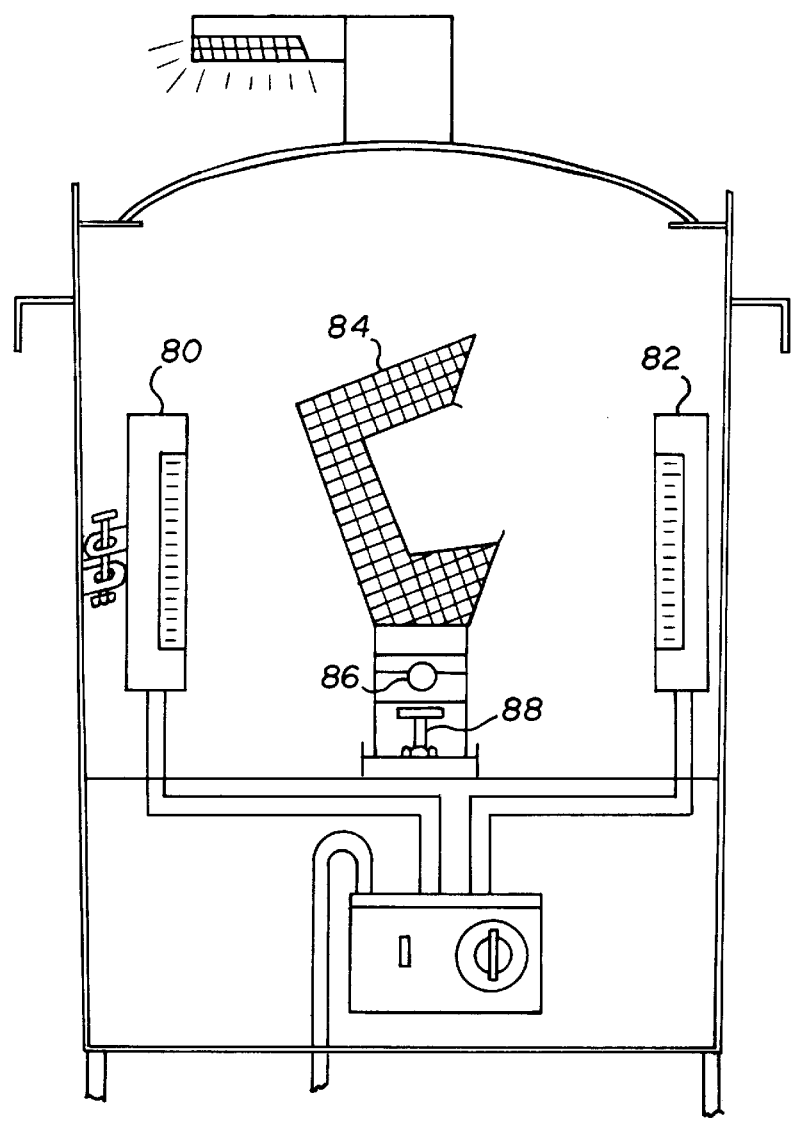
FIG. 3 is another embodiment of a gas grill illustrating a different configuration of gas burners and cooking rack.
Figure 4:
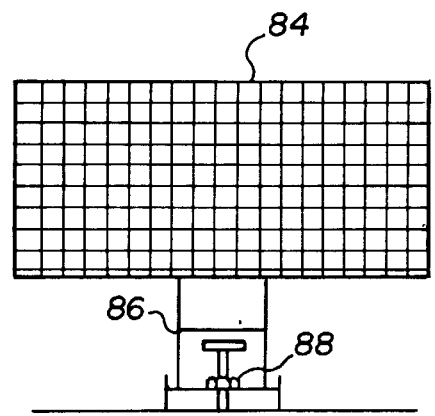
FIG. 4 is a simplified diagram of the grill of FIG. 3 with the cooking rack rotated about 90°.

Referring to FIGS. 3–4, gas heating elements 80, 82 are vertically oriented to provide heat from the sides. A basket 84 is mounted in the housing and has a general "C" configuration. Food to be cooked is placed inside the "C" on the bottom portion, along the vertically inclined rear or on top of the rack at the top of the "C". The basket is connected by a pivotal connection 86 that allows the basket to be tilted to accommodate foods of various shapes such as a whole chicken, turkey or roast. To ensure uniform cooking of such a large item, the basket can be rotated about a pivot pin 88 on which the basket is mounted. As illustrated, the basket can be rotated manually to ensure uniform cooking or may be rotated by means of a motor attachment (not shown).

Figure 5:
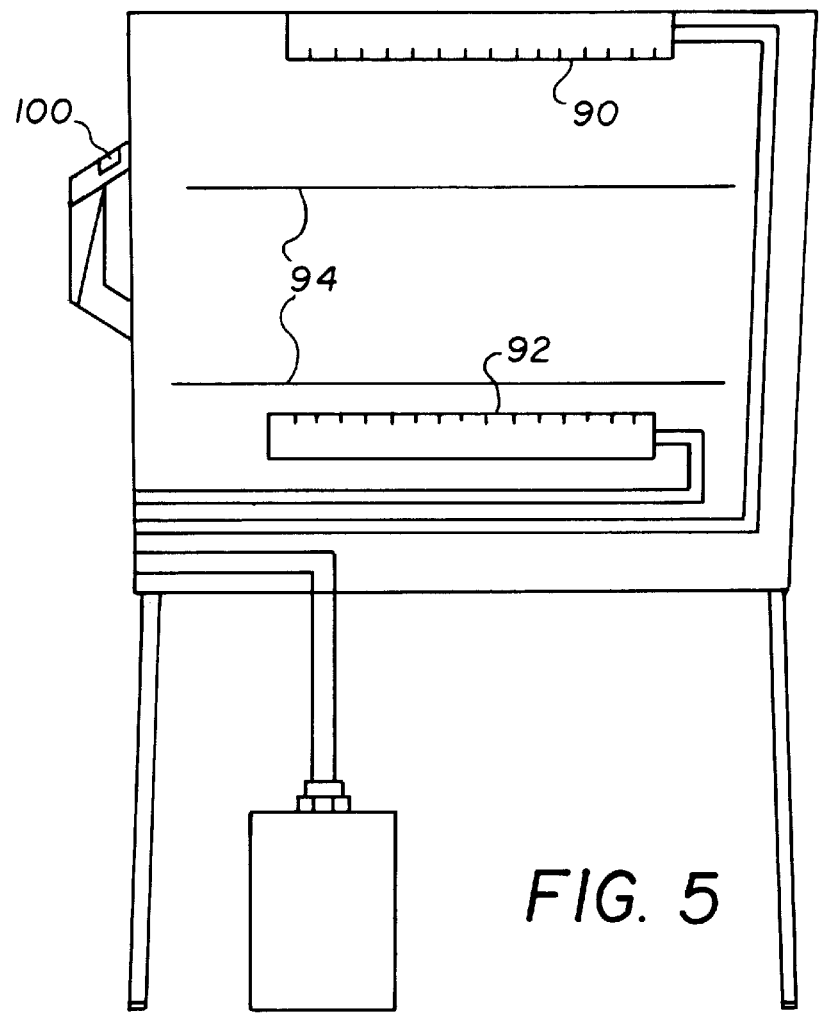
FIG. 5 is a diagrammatic sectional view of a gas grill with a door that opens to provide access to the cooking rack and equipped with a lighting assembly.
Figure 6:
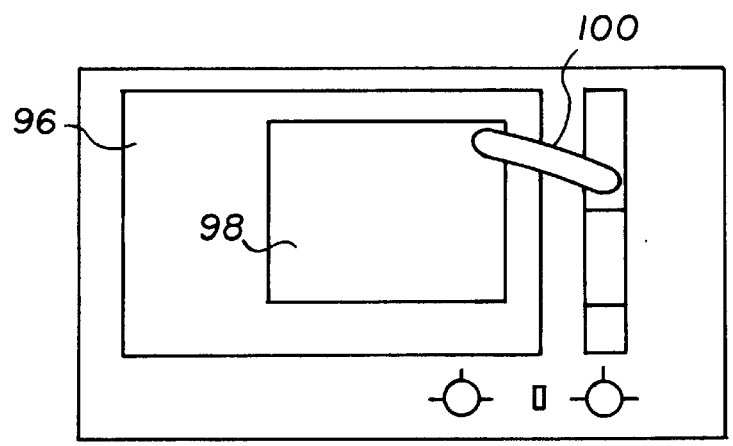
FIG. 6 is a front view of the grill of FIG. 5.

FIGS. 5 and 6 illustrate a grill that is configured as an oven with heating elements 90, 92 positioned along the top and bottom of the oven, respectively. The cooking rack 94 is, of course, positioned between the heating elements 90, 92 much the same as for a conventional oven. There may be more than one rack as in a conventional oven and different foods can be cooked at the same time by appropriately regulating the burners so that the upper and lower racks are at different temperatures or so that food on one rack absorbs more heat than food on the other rack. The oven has a door 96 that can be mounted to swing open either vertically or horizontally. It has a window 98 and the door handle has a light assembly 100 incorporated to illuminate the oven interior to view cooking progress. Preferably, the lighting assembly is detachable to facilitate directing light to all corners of the oven. Alternatively, the lighting assembly is pivotally mounted to vary the incidence of light in the oven.

Figure 7:
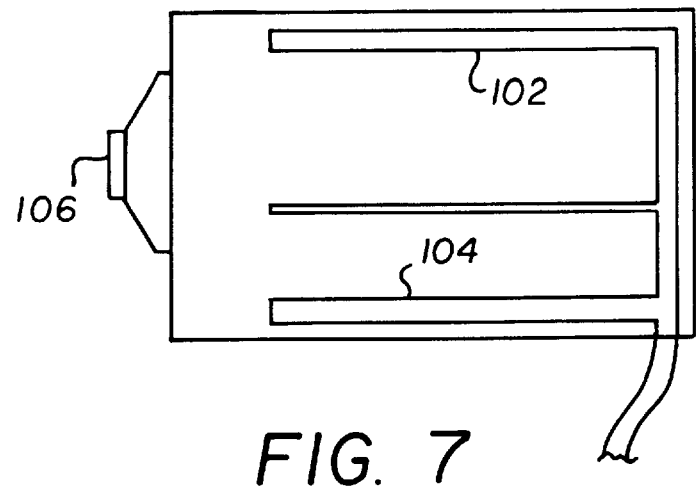
FIG. 7 is a gas grill similar to FIG. 5 but illustrating a different configuration of the gas burners.
Figure 8:
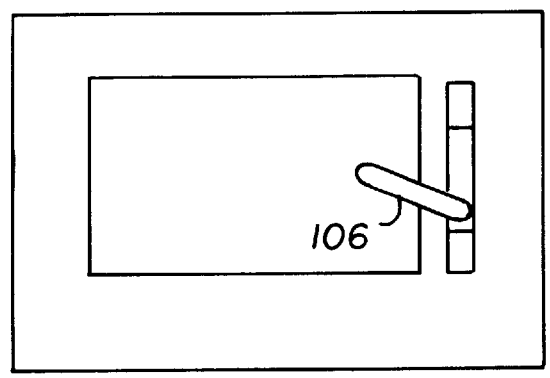
FIG. 8 is a front view of the grill of FIG. 7.

FIGS. 7 and 8 are similar to FIGS. 5 and 6 in that the grill is configured as an oven, but the grill has heating elements 102, 104 that heat not only from the top and bottom of the oven, but also heat from the rear of the oven as well. Providing heat from the rear is advantageous when an odd shaped article of food is to be cooked because it ensures uniform and thorough cooking in the minimum amount of time. It is also equipped with a lighting assembly 106 for viewing the food without opening the door. The lighting assembly is shown pivoted to the left to a position to illuminate the oven.

Figure 9:
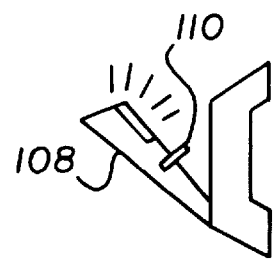
FIG. 9 is a side view of the lighting assembly for the door handles of the grills.

FIG. 9 further illustrates a lighting assembly 108 on a door handle. It has a push-button 110 for operating the light. The lighting assembly can pivot to the left to illuminate the interior of the grill. Preferably, the lighting assembly detaches from the handle to focus light where desired.

It can now be appreciated that a grill has been presented that heats food from both sides to speed cooking time. Where it is desired to heat only one surface of the food, the charcoal may be positioned in only a portion of the grill to accommodate such cooking or, in the case of a gas grill, only one section of the heating elements may be fueled to provide heating where it is desired. By providing a see-through cover, the cooking progress may be observed without losing heat, thereby minimizing cooking time.

While the invention has been described with particular reference to the preferred embodiments, it will be understood by those skilled in the art that various changes may be made and equivalents may be substituted for elements of the preferred embodiments without departing from invention. For example, the cooking racks are intended to be interchangeable; that is, a rack from one embodiment can be used in a different embodiment. In addition, many modifications may be made to adapt a particular situation and material to a teaching of the invention without departing from the essential teachings of the present invention.

As is evident from the foregoing description, certain aspects of the invention are not limited to the particular details of the examples illustrated and it is therefore contemplated that other modifications and applications will occur to those skilled in the art. For example, a household gas supply can be used by adjusting the regulator for the particular type of fuel. It is accordingly intended that the claims shall cover all such modifications and applications as do not depart from the true spirit and scope of the invention.

What is claimed is:

1. A grill, comprising:

a housing having top and bottom walls, a rear wall, and left and right sidewalls;

a top heating element extending along said top wall;

a bottom heating element extending along said bottom wall;

a door opposite said rear wall having a window;

a handle on said door incorporating a lighting assembly, said lighting assembly being detachable from said handle; and a gas regulator mounted on said housing below said door for regulating fuel to said top and bottom heating elements.

2. A grill, as set forth in claim 1, including:

a first conduit connecting said top heating element to said gas regulator; and a second conduit connecting said bottom heating element to said gas regulator.

* * * * *